(12) United States Patent
Satyaseelan et al.

(10) Patent No.: US 11,088,581 B2
(45) Date of Patent: Aug. 10, 2021

(54) ROTOR ASSEMBLY INCLUDING AN END RING STAKED WITH CURVED INDENTATIONS AND METHOD THEREOF

(71) Applicant: Schaeffler Technologies AG & Co. KG, Herzogenaurach (DE)

(72) Inventors: Ayyalraju Satyaseelan, Wooster, OH (US); Derek Deacon, Mogadore, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 254 days.

(21) Appl. No.: 16/112,836

(22) Filed: Aug. 27, 2018

(65) Prior Publication Data

US 2020/0067360 A1 Feb. 27, 2020

(51) Int. Cl.
*H02K 1/30* (2006.01)
*H02K 15/02* (2006.01)
*H02K 1/28* (2006.01)

(52) U.S. Cl.
CPC ............ *H02K 1/30* (2013.01); *H02K 15/02* (2013.01); *H02K 1/28* (2013.01); *H02K 15/028* (2013.01)

(58) Field of Classification Search
CPC ............ H02K 1/28; H02K 1/30; H02K 15/02; H02K 15/028

USPC .............. 310/112, 113, 114, 156.12, 156.13, 310/156.14, 156.22, 216.114
See application file for complete search history.

(56) References Cited

U.S. PATENT DOCUMENTS

| | | | |
|---|---|---|---|
| 2012/0248906 A1* | 10/2012 | Hayslett | H02K 1/2766 310/61 |
| 2016/0105060 A1 | 4/2016 | Lindemann et al. | |
| 2017/0070127 A1* | 3/2017 | Matsumoto | H02K 1/2706 |
| 2018/0257475 A1* | 9/2018 | Satyaseelan | B60K 6/48 |
| 2019/0040917 A1* | 2/2019 | Persinger | F16H 61/143 |
| 2019/0190334 A1* | 6/2019 | Payne | B60K 6/48 |

* cited by examiner

*Primary Examiner* — Tulsidas C Patel
*Assistant Examiner* — Rashad H Johnson (57) ABSTRACT

A rotor assembly for an electric motor, including: a rotor carrier hub; a rotor radially disposed about the rotor carrier hub; and an annular end ring. The rotor carrier hub includes: an axis of rotation; an annular outer surface facing in a first axial direction parallel to the axis of rotation; a circumferentially disposed outer surface; a curved indentation in the annular outer surface; and a protrusion extending beyond the circumferentially disposed outer surface in a radially outward direction orthogonal to the axis of rotation and radially aligned with the curved indentation such that a line, in the radially outward direction, passes through the curved indentation and the protrusion. The end ring is in contact with the circumferentially disposed outer surface of the rotor carrier hub and the protrusion. The protrusion blocks displacement of the rotor in the first axial direction.

19 Claims, 9 Drawing Sheets

ROTOR ASSEMBLY INCLUDING AN END RING STAKED WITH CURVED INDENTATIONS AND METHOD THEREOF

TECHNICAL FIELD

The present disclosure relates to a rotor assembly for an electric motor with an end ring staked by curved indentations to a rotor carrier hub, and a method thereof.

BACKGROUND

It is known to stake a rotor hub carrier for an electric motor, for purposes of clamping a rotor for the electric motor to the rotor carrier hub, by deforming, with a planar surface of a punch, a surface of a rotor hub carrier. The staked material has planar surfaces and cut edges, which weaken the staked material.

SUMMARY

According to aspects illustrated herein, there is provided rotor assembly for an electric motor, including: a rotor carrier hub; a rotor radially disposed about the rotor carrier hub; and an annular end ring. The rotor carrier hub includes: an axis of rotation; an annular outer surface facing in a first axial direction parallel to the axis of rotation; a circumferentially disposed outer surface; a curved indentation in the annular outer surface; and a protrusion extending beyond the circumferentially disposed outer surface in a radially outward direction orthogonal to the axis of rotation and radially aligned with the curved indentation such that a line, in the radially outward direction, passes through the curved indentation and the protrusion. The end ring is in contact with the circumferentially disposed outer surface of the rotor carrier hub and the protrusion. The protrusion blocks displacement of the rotor in the first axial direction.

According to aspects illustrated herein, there is provided rotor assembly for an electric motor, including: a rotor carrier hub; a rotor radially disposed about the rotor carrier hub; and an annular end ring. The rotor carrier hub includes: an annular outer surface facing in a first axial direction parallel to the axis of rotation; a circumferentially disposed outer surface; a curved indentation in the annular outer surface, the curved indentation extending from the annular outer surface in a second axial direction, opposite the first axial direction and including a longitudinal axis parallel to the axis of rotation; a protrusion extending beyond the circumferentially disposed outer surface in a radially outward direction orthogonal to the axis of rotation and radially aligned with the curved indentation such that a line, in the radially outward direction, passes through the curved indentation and the protrusion; and a first surface continuous with the annular surface, forming the curved indentation, and no portion of which forms a plane; an annular end ring in contact with the circumferentially disposed outer surface and the protrusion; and a rotor axially sandwiched between the annular end ring and a portion of the rotor carrier hub.

According to aspects illustrated herein, there is provided method of securing a rotor of a rotor assembly for an electric motor, including: installing an annular end ring of a rotor carrier hub of the rotor assembly on a circumferentially disposed surface of the rotor carrier hub; axially bracketing the rotor between the annular end ring and a portion of the rotor carrier hub; forming, with a punch, a curved indentation in an annular outer surface of the rotor carrier hub, the annular outer surface facing in a first axial direction parallel to an axis of rotation for the rotor carrier hub; forming, with the punch, a protrusion extending in a radially outward direction, orthogonal to the axis of rotation for the rotor, past the circumferentially disposed surface; contacting the annular end ring with the protrusion; and blocking, with the protrusion, displacement of the annular end ring in a second axial direction, opposite the first axial direction.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 9:
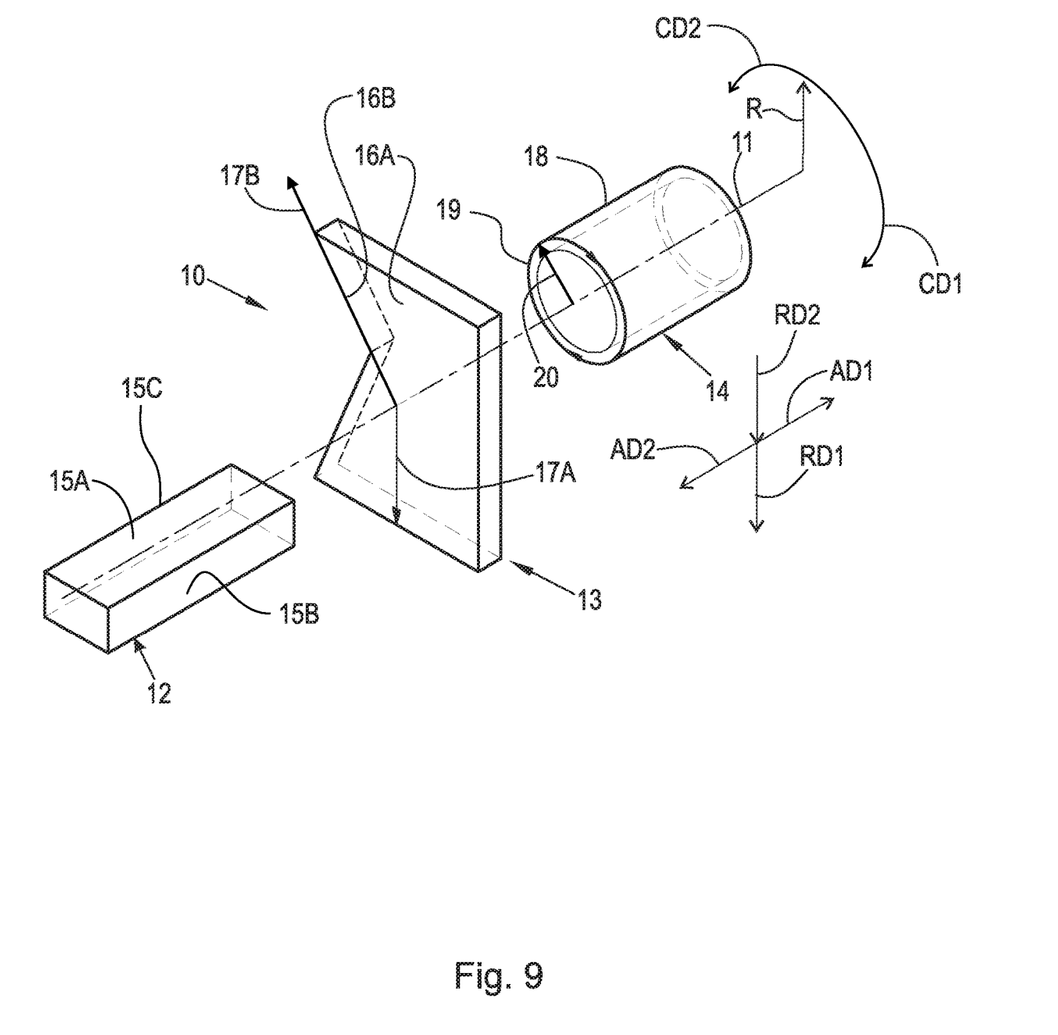
FIG. 9 is a perspective view of a cylindrical coordinate system demonstrating spatial terminology used in the present application.

FIG. 9 is a perspective view of cylindrical coordinate system 10 demonstrating spatial terminology used in the present application. The present application is at least partially described within the context of a cylindrical coordinate system. System 10 includes axis of rotation, or longitudinal axis, 11, used as the reference for the directional and spatial terms that follow. Opposite axial directions AD1 and AD2 are parallel to axis 11. Radial direction RD1 is orthogonal to axis 11 and away from axis 11. Radial direction RD2 is orthogonal to axis 11 and toward axis 11. Opposite circumferential directions CD1 and CD2 are defined by an endpoint of a particular radius R (orthogonal to axis 11) rotated about axis 11, for example clockwise and counterclockwise, respectively.

To clarify the spatial terminology, objects 12, 13, and 14 are used. As an example, an axial surface, such as surface 15A of object 12, is formed by a plane co-planar with axis 11. However, any planar surface parallel to axis 11 is an axial surface. For example, surface 15B, parallel to axis 11 also is an axial surface. An axial edge is formed by an edge, such as edge 15C, parallel to axis 11. A radial surface, such as surface 16A of object 13, is formed by a plane orthogonal to axis 11 and co-planar with a radius, for example, radius 17A. A radial edge is co-linear with a radius of axis 11. For example, edge 16B is co-linear with radius 17B. Surface 18 of object 14 forms a circumferential, or cylindrical, surface. For example, circumference 19, defined by radius 20, passes through surface 18.

Axial movement is in axial direction AD1 or AD2. Radial movement is in radial direction RD1 or RD2. Circumferential, or rotational, movement is in circumferential direction CD1 or CD2. The adverbs "axially," "radially," and "circumferentially" refer to movement or orientation parallel to axis 11, orthogonal to axis 11, and about axis 11, respectively. For example, an axially disposed surface or edge extends in direction AD1, a radially disposed surface or edge extends in direction RD1, and a circumferentially disposed surface or edge extends in direction CD1.

Figure 1:
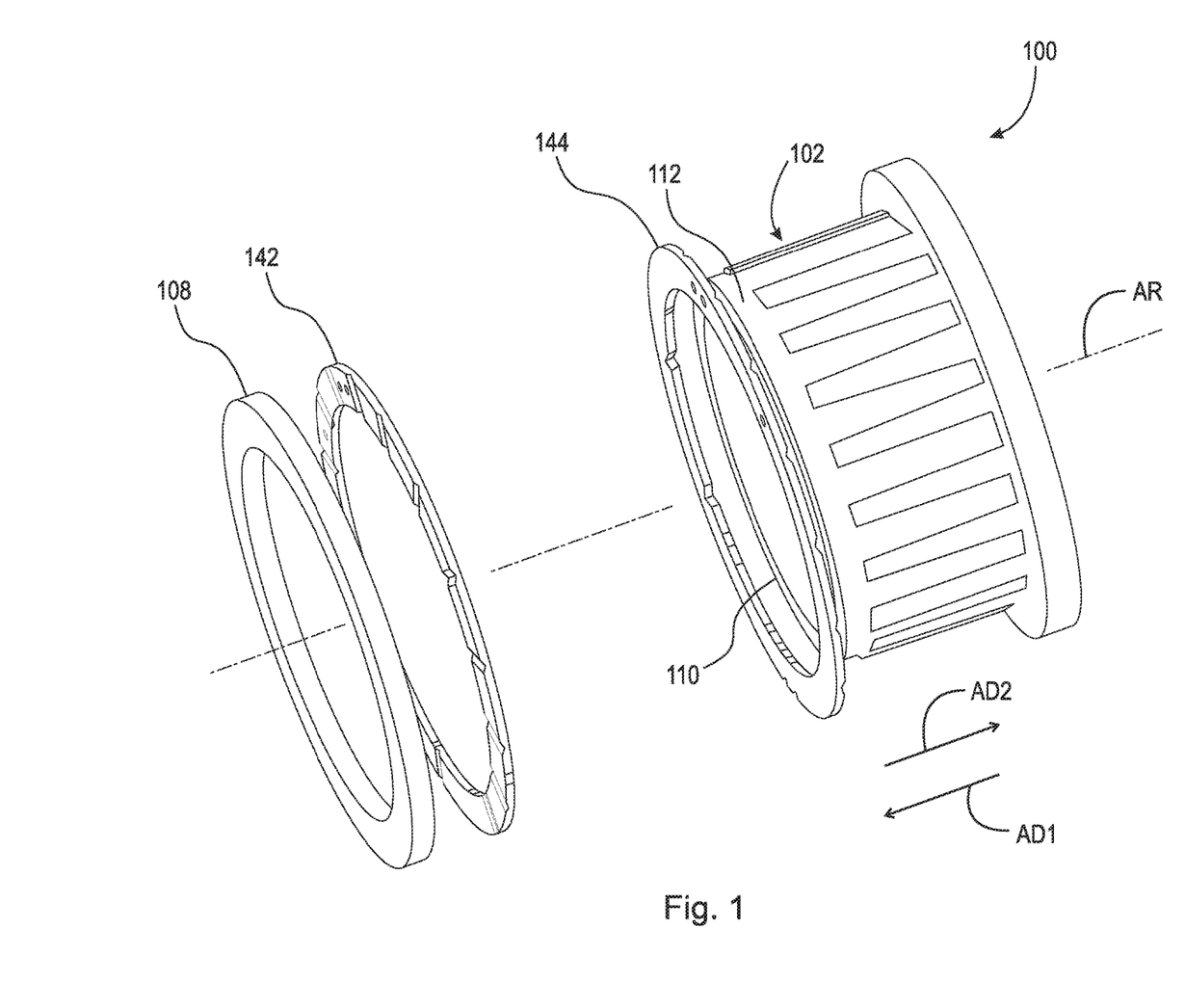
FIG. 1 is an exploded view of a rotor carrier hub, retention plates, and an end ring for a rotor assembly, prior to forming curved indentations in the rotor carrier hub to stake the end ring.

FIG. 1 is an exploded view of a rotor carrier hub, retention plates, and an end ring for rotor assembly 100, prior to forming curved indentations in the rotor carrier hub to stake the end ring.

Figure 2:
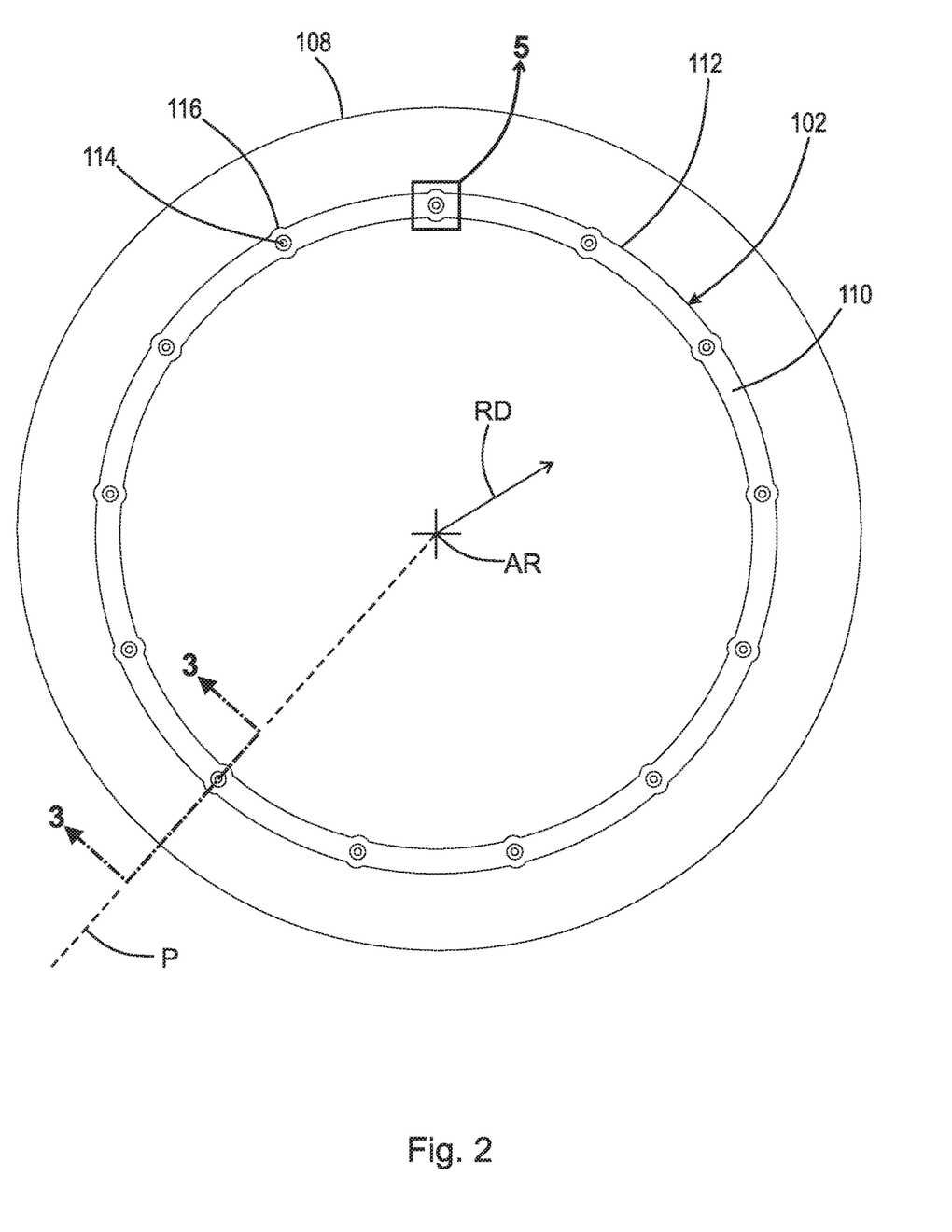
FIG. 2 is a bottom view of a rotor assembly including an end ring staked with curved indentations.

FIG. 2 is a bottom view of rotor assembly 100 with the end ring staked with curved indentations.

Figure 3:
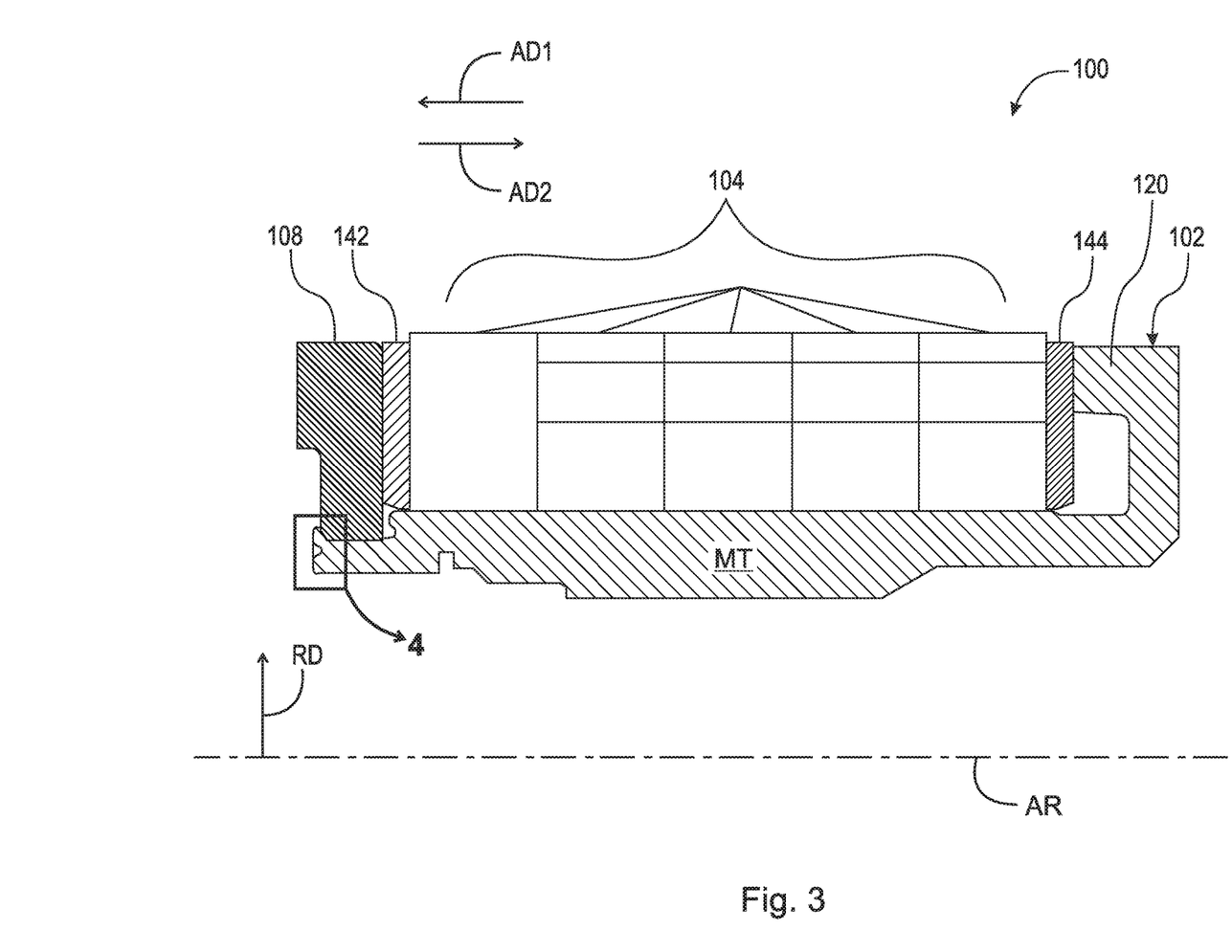
FIG. 3 is a cross-sectional view generally along line 3-3 in FIG. 2.

FIG. 3 is a cross-sectional view generally along line 3-3 in FIG. 2.

Figure 4:
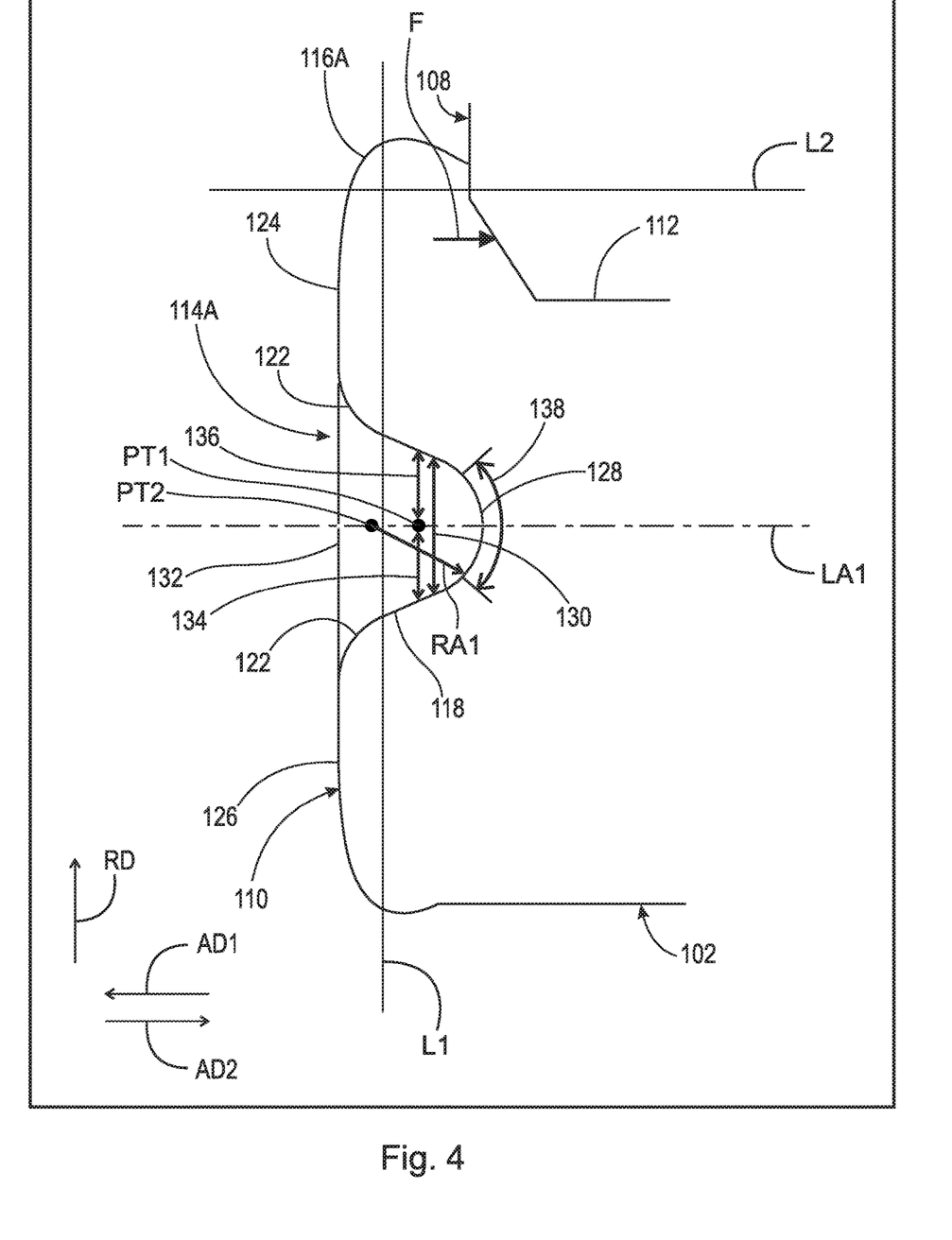
FIG. 4 is a detail of area 4 in FIG. 3.

FIG. 4 is a detail of area 4 in FIG. 3.

Figure 5:
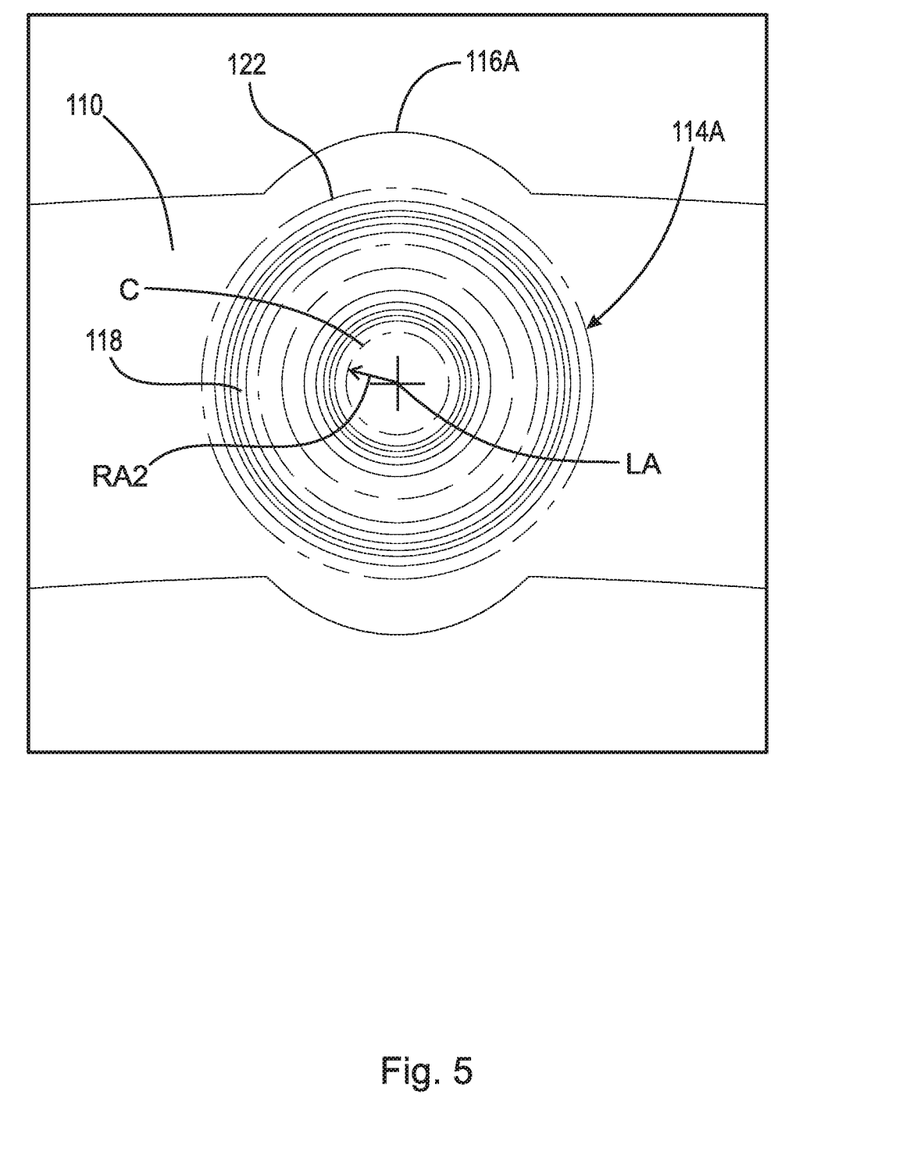
FIG. 5 is a detail of area 5 in FIG. 2.

FIG. 5 is a detail of area 5 in FIG. 2.

Figure 6:
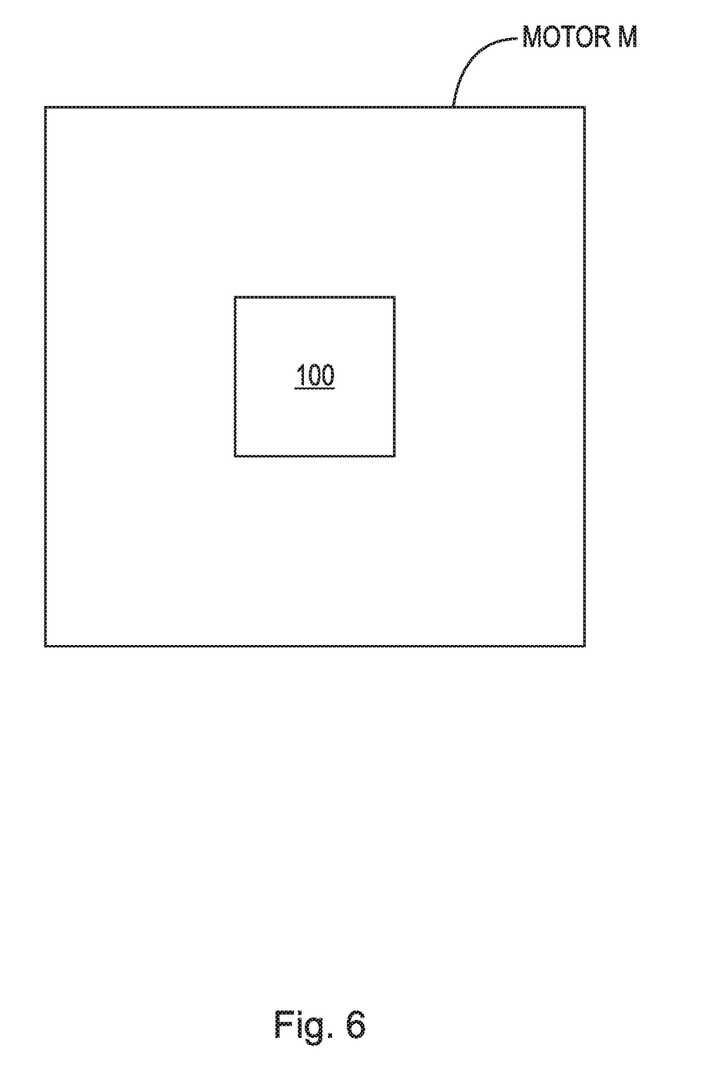
FIG. 6 is a schematic block diagram of an electric motor including the rotor assembly of FIG. 2.

FIG. 6 is a schematic block diagram of an electric motor including rotor assembly 100 of FIG. 2. The following should be viewed in light of FIGS. 1 through 6. To Rotor assembly 100 for electric motor M includes: axis of rotation AR; rotor carrier hub 102; rotor 104 radially disposed about hub 102; and end ring 108. Rotor 104 can be any rotor configuration known in the art. Hub 102 includes: annular outer surface 110 facing in axial direction AD1, parallel to axis of rotation AR; circumferentially disposed surface 112; at least one curved indentation 114 in surface 110 and extending from surface 110 in axial direction AD2, opposite direction AD1; and at least one protrusion 116. As described below, each protrusion 116 is formed by creation of a respective indentation 114. Each indentation 114 is formed in hub 102 by, or defined by, a respective surface 118. In the example of FIG. 2, hub 102 includes multiple indentations 114 and multiple protrusions 116. Only one indentation 114 and one protrusion 116 are labeled in FIG. 2; however, it should be understood that FIG. 2 shows 13 indentations 114 and 13 protrusions 116. By "curved indentation," we mean that none of surface 118 is planar. Stated otherwise, surface 118 forms a smooth curve. Unless noted otherwise, the discussion that follows is directed to indentation 114A and protrusion 116A shown in FIG. 4. However, it should be understood that the discussion is applicable to each indentation 114 and protrusion 116 in the example of FIG. 2. In general, a reference character "[digit][digit][digit][letter]" designates a specific example of an element labeled as "[digit][digit][digit]." For example, protrusion 116A is a specific example from among protrusions 116.

End ring 108 is in contact with surface 112 and protrusion 116A. Rotor 104 is axially sandwiched, or bracketed, by end ring 108 and portion 120 of hub 102. Protrusion 116A extends beyond surface 112 in radially outward direction RD orthogonal to axis of rotation AR. Stated otherwise, direction RD extends outward from axis AR. Indentation 114A and protrusion 116A are paired such that line L1, in radial direction RD, passes through curved indentation 114A and protrusion 116A. Line L2, in axial direction AD1, passes through protrusion 116A and end ring 108.

Hub 102 includes intersection 122 of surface 110 and surface 118 of indentation 114A. In an example embodiment, intersection 122 is free of an edge. By "edge," we mean a discontinuity or crease in intersection 122, for example an intersection of two planar surfaces or an intersection of a curved surface and a planar surface. Stated otherwise, intersection 122 is formed by continuous smooth curves. Thus, indentation 114A does not cut into surface 118. In FIGS. 3 and 4, surface 110 includes portions 124 and 126. Indentation 114A: is radially disposed between portions 124 and 126; and in the radial cross-section of FIGS. 3 and 4 is in a shape of a smooth curve from portion 124 to portion 126. The radial cross-section of FIGS. 3 and 4 is formed by plane P co-linear with axis AR and orthogonal to axis AR.

Curved indentation 114A includes end 128 extending furthest into hub 102 in axial direction AD2. In an example embodiment, at least a portion of curved indentation 114A tapers inwardly in axial direction AD2. For example, dimension 130, in direction RD, of indentation 114A decreases in direction AD2. In an example embodiment, an entirety of curved indentation 114A tapers inwardly in axial direction AD2.

Curved indentation 114A includes: opening 132 at surface 110; and longitudinal axis LA1. By "longitudinal axis," we mean an axis passing through opening 132 and end 128. In an example embodiment, curved indentation 114A is symmetrical about longitudinal axis LA1. In an example embodiment, longitudinal axis LA1 is parallel to axis of rotation AR. In an example embodiment, protrusion 114A is symmetrical about axis LA1. For example, distances 134 and 136, in direction RD, measure from point PT1 on axis LA1 to surface 118, and are equal as point P is displace along axis LA1.

In an example embodiment, portion 138 of surface 118 and including end 128, forms a portion of a circle centered on point PT1 axis LA1 and having radius RA1. Referring to FIG. 5, in an example embodiment, a portion of surface 118 of indentation 114A is in a shape of circle C, centered on axis LA1 and with radius RA2.

It should be understood that, in an example embodiment, for multiple curved indentations 114, not every curved indentation 114 has the same characteristics. For example, some, but not all of the multiple curved indentations 114 include: at least a portion with a taper; an entirety with a taper; a longitudinal axis orthogonal to axis AR; symmetry about a longitudinal axis; or portions of surface 118 forming a circle.

In an example embodiment: assembly 100 includes retention plates 142 and 144. Plate 142 is axially disposed between end ring 108 and rotor 104. Plate 144 is axially disposed between rotor 104 and portion 120. Protrusions 116 impress force F, in direction AD2, on end ring 108. End ring transmits force F through plates 142 and 144 and rotor 104 and force F reacts against portion 120. As a result, protrusions 116 axially clamp rotor 104 between end ring 108 and portion 120.

Figure 7:
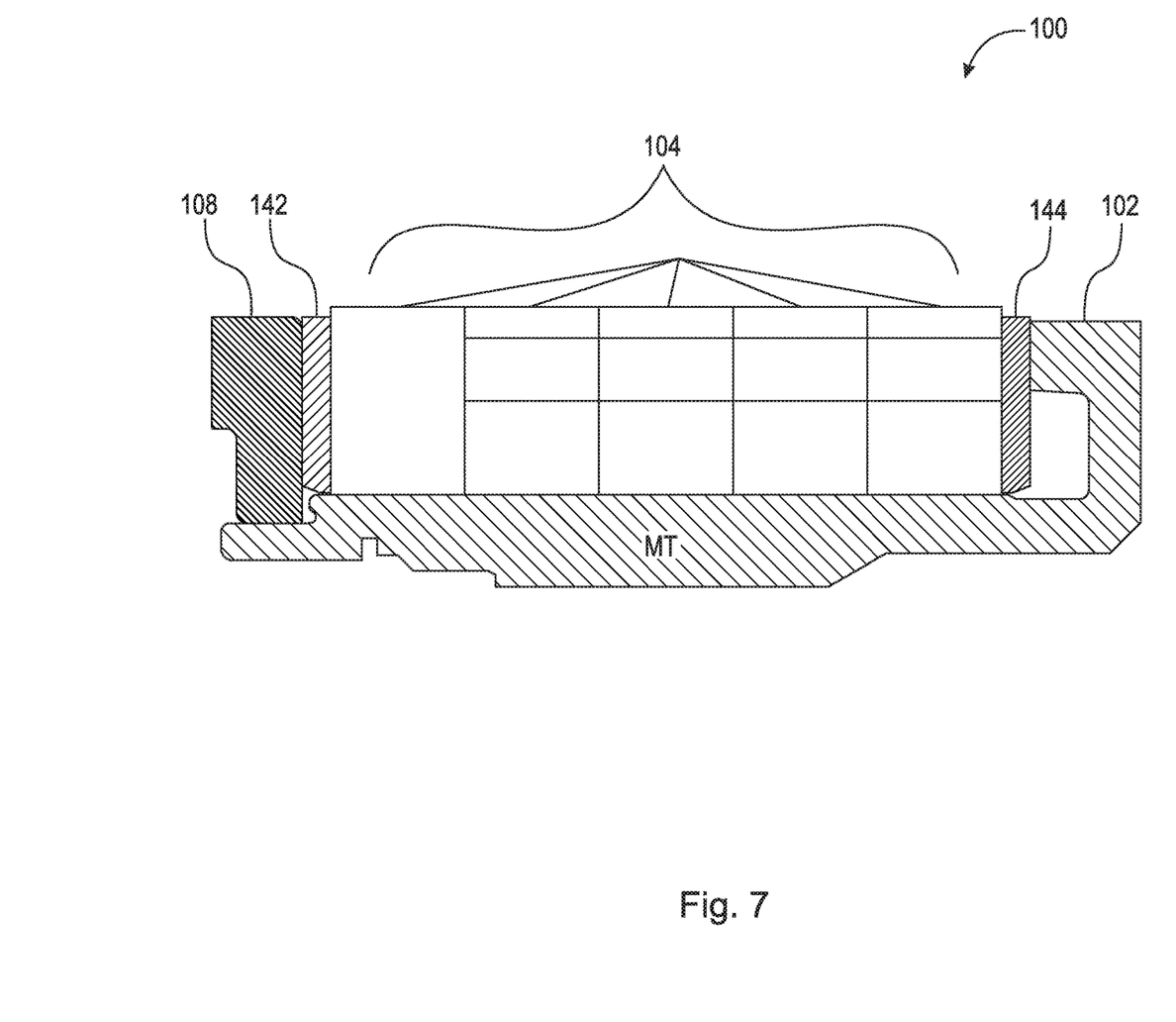
FIG. 7 is a cross-sectional view of the rotor assembly in FIG. 1 with a rotor added and the end ring set in place.

FIG. 7 is a cross-sectional view of rotor assembly in FIG. 1 with rotor 104 added and end ring 108 set in place.

Figure 8:
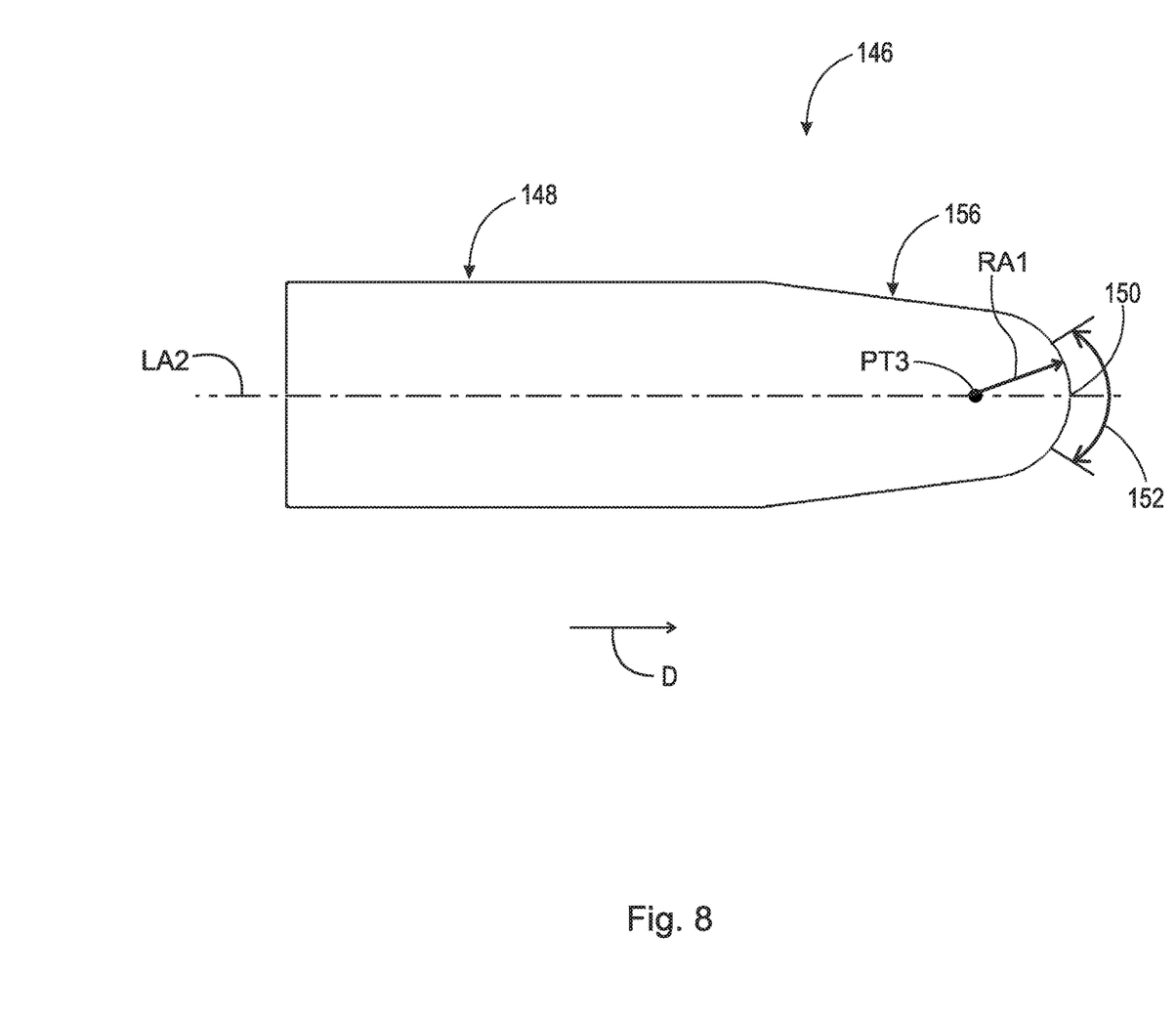
FIG. 8 is a side view of a punch.

FIG. 8 is a cross-sectional view of punch 146 used to form indentations 114 and protrusions 116. The following should be viewed in light of FIGS. 1 through 8. Punch 146 includes longitudinal axis LA2. In an example embodiment, outer surface 148 of punch 146 is symmetrical about axis LA2. Punch 146 includes blunt or rounded end 150. At end 150, surface 148 is formed of one or more smooth curves. In an example embodiment, portion 152 of surface 148, including end 150, is in a shape of a portion of a circle centered on point PT3 on axis LA2 and having radius RA3. Portion 156 includes the portion of punch 146 used to form indentation 114A. Portion 156 is free of edges, with edges defined above. In an example embodiment, portion 156 of punch 146 tapers inwardly toward axis LA2 in direction D parallel to axis LA2.

The following describes a method of securing rotor 104 for electric motor M. Although the method is presented as a sequence of steps for clarity, no order should be inferred from the sequence unless explicitly stated. A first step installs annular end ring 108 on circumferentially disposed surface 112 of rotor carrier hub 102. A second step axially brackets rotor 104 between annular end ring 108 and portion 120 of rotor carrier hub 102. End ring 108 can be installed using any means known in the art, such as heating end ring 108 and placing end ring 108 about hub 102. FIG. 7 illustrates the first and second steps.

A third step forms, with punch 146, curved indentation 114A in annular outer surface 110 of rotor carrier hub 102, annular outer surface 110 facing in axial direction AD1. A fourth step forms, with punch 146, protrusion 116A extending in radially outward direction RD, past circumferentially disposed surface 112. A fifth step contacts annular end ring 108 with protrusion 116A. A sixth step blocks, with protrusion 116A, displacement of annular end ring 108 in axial direction AD2.

In an example embodiment, forming, with punch 146, curved indentation 114A in annular outer surface 110 of rotor carrier hub 102 includes forming curved indentation 114A with surface 118 defining curved indentation 114A, and with no portion of surface 118 forming a plane. In an example embodiment, forming, with punch 146, curved indentation 114A in annular outer surface 110 of rotor carrier hub 102 includes tapering curved indentation 114A inwardly in axial direction AD2.

In an example embodiment, forming, with punch 146, curved indentation 114A in annular outer surface 110 of rotor carrier hub 102 includes forming curved indentation 114A symmetrically about longitudinal axis LA2, with axis LA2 disposed at least partly in axial direction AD1. In an example embodiment, forming, with punch 146, curved indentation 114A in annular outer surface 110 of rotor carrier hub 102 includes forming curved indentation 114A symmetrically about longitudinal axis LA2, with axis LA2 parallel to axis AR.

In an example embodiment: curved indentation 114A includes longitudinal axis LA2 parallel to axis of rotation AR; and forming, with punch 146, curved indentation 114A in annular outer surface 110 of rotor carrier hub 102 includes: forming surface 118 defining curved indentation 114A; and forming, in a radial cross-section defined by a plane P co-linear with axis of rotation AR and orthogonal to axis of rotation AR, portion 138 of surface 118, through which longitudinal axis LA1 passes, in a shape of a portion of a circle. In an example embodiment, forming, with punch 146, protrusion 116A extending in radially outward direction RD, past circumferentially disposed surface 112 includes forming protrusion 116A such that line L2, parallel to axis of rotation AR, passes through annular end ring 108 and protrusion 116A.

Since punch 146 and surface 118 do not includes edges, punch 146 forms indentation 114A by deforming and displacing material MT, composing hub 102, without cutting into material MT. Thus, fracture zones that weaken material MT at hub 102 and protrusions 116 and reduce the durability and service life of rotor carrier hub 102 are not formed during the formation of indentations 114 and protrusions 116.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS 10 cylindrical system
11 axis of rotation
AD1 axial direction
AD2 axial direction
RD1 radial direction
RD2 radial direction
CD1 circumferential direction
CD2 circumferential direction
R radius
12 object
13 object
14 object
15A surface
15B surface
15C edge
16A surface
16B edge
17A radius
17B radius
18 surface
19 circumference
20 radius
AD direction
AR axis of rotation
C circle
D direction
F force, end ring 108
LA1 longitudinal axis, indentation 114A
LA2 longitudinal axis, punch 146
L1 line
L2 line
M motor
MT material, hub 102
PT1 point, line L1
PT2 center point, portion 138
PT3 center point, portion 152
RA1 radius, portion 138
RA2 radius, circle C
RA3 radius, portion 152
100 rotor assembly
102 rotor carrier hub
104 rotor
106 rotor segment
108 end ring 110 cylindrical outer surface, carrier hub
112 outer surface, carrier hub
114 curved indentation
114A curved indentation
116 protrusion
116A protrusion
118 surface, hub 102
120 portion, hub 102
122 intersection, surface 110 and indentation 114A
124 portion, surface 110
126 portion, surface 110
128 end indentation 114A
130 dimension, indentation 114A
132 opening, indentation 114A
134 distance, indentation 114A
136 distance, indentation 114A
142 retention plate
144 retention plate
146 punch
148 outer surface, punch 146
150 end, punch 146
152 portion, punch 146
156 portion, punch 146

The invention claimed is:

1. A rotor assembly for an electric motor, comprising:
a rotor carrier hub including:
  an axis of rotation;
  an annular outer surface facing in a first axial direction parallel to the axis of rotation;
  a circumferentially disposed outer surface;
  a curved indentation in the annular outer surface; and,
  a protrusion:
    extending from the circumferentially disposed outer surface in a radially outward direction orthogonal to the axis of rotation;
    extending beyond the circumferentially disposed outer surface in the radially outward direction; and,
    radially aligned with the curved indentation such that a line, in the radially outward direction, passes through the curved indentation and the protrusion;
a rotor radially disposed about the rotor carrier hub; and,
an annular end ring:
  in contact with:
    the circumferentially disposed outer surface of the rotor carrier hub; and,
    the protrusion;
  extending radially outwardly past the protrusion; and,
  blocking displacement of the rotor in the first axial direction.

2. The rotor assembly of claim 1, wherein a line, in the first axial direction, passes through the protrusion and the annular end ring.

3. The rotor assembly of claim 1, wherein:
the rotor carrier hub includes a first surface forming the curved indentation;
the first surface is continuous with the annular outer surface; and,
no portion of the first surface forms a plane.

4. The rotor assembly of claim 1, wherein in a radial cross-section, defined by a plane co-linear with the axis of rotation and orthogonal to the axis of rotation:
the annular outer surface includes a first portion and a second portion;
the curved indentation is radially disposed between the first portion and the second portion; and,
the curved indentation is in a shape of a smooth curve from the first portion to the second portion.

5. The rotor assembly of claim 1, wherein the curved indentation:
extends from the annular outer surface in a second axial direction, opposite the first axial direction; and,
tapers inwardly in the second axial direction.

6. The rotor assembly of claim 1, wherein:
the curved indentation includes a longitudinal axis; and,
the curved indentation is symmetrical about the longitudinal axis.

7. The rotor assembly of claim 1, wherein the curved indentation includes a longitudinal axis parallel to the axis of rotation.

8. The rotor assembly of claim 1, wherein:
the curved indentation includes a longitudinal axis parallel to the axis of rotation; and,
the curved indentation is symmetrical about the longitudinal axis.

9. The rotor assembly of claim 1, wherein:
the curved indentation includes a longitudinal axis parallel to the axis of rotation;
the rotor carrier hub includes a first surface forming the curved indentation; and,
in a radial cross-section, defined by a plane co-linear with the axis of rotation and orthogonal to the axis of rotation, a portion of the first surface, through which the longitudinal axis passes, is in a shape of a portion of a circle.

10. The rotor assembly of claim 1, wherein:
the curved indentation includes a longitudinal axis parallel to the axis of rotation;
the rotor carrier hub includes a first surface forming the curved indentation;
the first surface is continuous with the annular outer surface; and,
at least a portion of the first surface is in a shape of a circle centered on the longitudinal axis.

11. A rotor assembly for an electric motor, comprising:
a rotor carrier hub including:
  an axis of rotation;
  an annular outer surface facing in a first axial direction parallel to the axis of rotation;
  a circumferentially disposed outer surface;
  a curved indentation in the annular outer surface, the curved indentation:
    extending from the annular outer surface in a second axial direction, opposite the first axial direction; and,
    including a longitudinal axis parallel to the axis of rotation;
  a protrusion:
    extending beyond the circumferentially disposed outer surface in a radially outward direction orthogonal to the axis of rotation; and,
    radially aligned with the curved indentation such that a line, in the radially outward direction, passes through the curved indentation and the protrusion; and,
  a first surface:
    continuous with the annular outer surface;
    forming the curved indentation; and,
    no portion of which forms a plane;
an annular end ring in contact with the circumferentially disposed outer surface and the protrusion; and,
a rotor axially sandwiched between the annular end ring and a portion of the rotor carrier hub.

12. The rotor assembly of claim 11, wherein:
an intersection of the first surface and the annular outer surface is free of an edge; or,
in a radial cross-section, defined by a plane co-linear with the axis of rotation and orthogonal to the axis of rotation, an intersection of the first surface and the annular outer surface is in a shape of a smooth curve.

13. The rotor assembly of claim 11, wherein in a radial cross-section, defined by a plane co-linear with the axis of rotation and orthogonal to the axis of rotation:
the annular outer surface includes a first portion and a second portion;
the first surface is radially disposed between the first portion and the second portion; and,
the first surface is in a shape of a smooth curve from the first portion to the second portion.

14. A method of securing a rotor of a rotor assembly for an electric motor, comprising:
installing an annular end ring of a rotor carrier hub of the rotor assembly on a circumferentially disposed outer surface of the rotor carrier hub;
axially bracketing the rotor between the annular end ring and a portion of the rotor carrier hub;
forming, with a punch, a first surface continuous with an annular outer surface of the rotor carrier hub and forming a curved indentation in the annular outer surface, the annular outer surface facing in a first axial direction parallel to an axis of rotation for the rotor carrier hub, the curved indentation extending from the annular outer surface in a second axial direction, opposite the first axial direction, and including a longitudinal axis parallel to the axis of rotation, wherein no portion of the first surface forms a plane;
forming, with the punch, a protrusion extending in a radially outward direction, orthogonal to the axis of rotation for the rotor, past the circumferentially disposed outer surface, and radially aligned with the curved indentation such that a line, in the radially outward direction, passes through the curved indentation and the protrusion;
contacting the annular end ring with the circumferentially disposed outer surface and the protrusion; and,
blocking, with the protrusion, displacement of the annular end ring in a second axial direction, opposite the first axial direction.

15. The method of claim 14, wherein forming, with the punch, the curved indentation in the annular outer surface includes tapering the curved indentation inwardly in the second axial direction.

16. The method of claim 14, wherein:
wherein forming, with the punch, the curved indentation in the annular outer surface includes forming the curved indentation symmetrically about a longitudinal axis; and,
the longitudinal axis is disposed at least partly in the first axial direction.

17. The method of claim 14 wherein forming, with the punch, the curved indentation in the annular outer surface includes forming the curved indentation symmetrically about a longitudinal axis for the curved indentation, the longitudinal axis parallel to the axis of rotation.

18. The method of claim 14, wherein:
the curved indentation includes a longitudinal axis parallel to the axis of rotation; and,
forming, with the punch, the curved indentation in the annular outer surface includes forming, in a radial cross-section defined by a plane co-linear with the axis of rotation and orthogonal to the axis of rotation, a portion of the first surface, through which the longitudinal axis passes, in a shape of a portion of a circle.

19. The method of claim 14, wherein forming, with the punch, the protrusion extending, in the radially outward direction orthogonal to the axis of rotation for the rotor, past the circumferentially disposed outer surface includes forming the protrusion such that a line, parallel to the axis of rotation, passes through the annular end ring and the protrusion.

* * * * *